United States Patent [19]
Roither

[11] Patent Number: 5,726,992
[45] Date of Patent: Mar. 10, 1998

[54] CIRCUIT FOR AND METHOD OF ASSESSING AN RDS SIGNAL

[75] Inventor: Gerhard Roither, München, Germany

[73] Assignee: SGS-Thomson Microelectronics GmbH, Grasbrunn, Germany

[21] Appl. No.: 569,781

[22] Filed: Dec. 8, 1995

[30] Foreign Application Priority Data

Dec. 14, 1994 [DE] Germany ............ 44 44 602.0

[51] Int. Cl.$^6$ ............................................. H03M 13/00
[52] U.S. Cl. ....................... 371/5.1; 371/6; 371/37.9; 371/57.2
[58] Field of Search ................. 371/5.1, 5.4, 6, 371/57.2, 61, 36, 37.9; 327/37, 33; 326/11, 35

[56] References Cited

U.S. PATENT DOCUMENTS

| | | | |
|---|---|---|---|
| 3,805,180 | 4/1974 | Widmer | 331/1 A |
| 3,906,379 | 9/1975 | Tuhro | 327/37 |
| 4,132,975 | 1/1979 | Koike | 371/37.9 |
| 4,222,013 | 9/1980 | Bowers et al. | 331/1 A |
| 4,595,992 | 6/1986 | Drogin | 364/569 |
| 4,613,913 | 9/1986 | Phillips | 360/51 |
| 4,943,965 | 7/1990 | Machida et al. | 371/36 |
| 5,001,728 | 3/1991 | Füldner | 375/82 |
| 5,399,987 | 3/1995 | Yamamoto et al. | 329/306 |
| 5,450,450 | 9/1995 | Lee | 375/354 |
| 5,497,126 | 3/1996 | Kosiec et al. | 331/1 A |

FOREIGN PATENT DOCUMENTS 32 45 438   6/1984   Germany .

OTHER PUBLICATIONS

Dietze, Andreas, "SDA 1000 Decodes Radio Data Signals," *Siemens Components*, vol. 25, No. 3, Jul. 1990, pp. 86–91.

*Spezifikation des Radio–Daten–Systems (RDS),* Deutsche Fassung EN 50067:1992, DIN (German Institute for Standardization), Beuth Verlag GMBH, Berlin, Feb. 1993, pp. 3–5, 14, 62–64. (Language: Germany).

*Specifications of the Radio Data System RDS for VHF/FM Sound Broadcasting,* Tech. 3244–E, Technical Centre of the European Broadcasting Union, Bruxelles, Belgium, Mar. 1984, pp.1–12.

Primary Examiner—Robert W. Beausoliel, Jr.
Assistant Examiner—Trinh L. Tu
Attorney, Agent, or Firm—David V. Carlson; Robert E. Mates; Seed and Berry LLP

[57] ABSTRACT

A method of assessing the quality and/or existence of a biphase-modulated digital RDS signal in a radio signal broadcast by a radio transmitter and received by a radio receiver equipped for RDS, in which a bit rate clock signal is produced on the receiver side whose bit rate is identical to that of the RDS signal, the bits both of the RDS signal and of the bit rate clock signal are each composed of two half bits, and of the two RDS half bits belonging to an RDS bit, one has a positive phase and the other one has a negative phase, and in which, for quality or existence assessment, the number of positive phase signs and the number of negative phase signs are determined which are each contained in the RDS signal during the half bit periods of a predetermined number of n adjacent half bits of the bit rate clock signal, and the RDS signal, depending on whether or not the ratio between the number of positive phase signs ascertained and the number of negative phase signs ascertained corresponds to a predetermined numerical ratio, is rated as being a signal of good quality or as a signal of poor quality, respectively, and in which an odd integer is used for n, which is greater than 2, and preferably is 3.

19 Claims, 3 Drawing Sheets

CIRCUIT FOR AND METHOD OF ASSESSING AN RDS SIGNAL

TECHNICAL FIELD

The invention relates to a circuit for and method of assessing the quality and/or existence of a biphase-modulated digital RDS signal in a radio signal broadcast by a radio transmitter and received by a radio receiver equipped for RDS, in which a bit rate clock signal is produced on the receiver side whose bit rate is identical to that of the RDS signal, the bits both of the RDS signal and of the bit rate clock signal are each composed of two half bits, and of the two RDS half bits belonging to an RDS bit, one has a positive phase and the other one has a negative phase.

BACKGROUND OF THE INVENTION

In the so-called RDS system (Radio Data System), radio stations broadcasting RDS information transmit the station identification, alternative frequencies of the radio station, program type etc. More details in this respect are described in the publication "Specifications of the Radio Data System RDS for VHF/FM Sound Broadcasting", Tech. 3244-E, Technical Centre of the European Broadcasting Union, Brussels, March 1984.

The transmission of RDS information makes use of a carrier oscillation having a binary bit sequence modulated thereonto which contains the RDS information. In doing so, each bit may be divided into two half bits, with a phase reversal taking place between adjacent half bits of the same bit. In case of an alteration of the logic value between two adjacent RDS bits, a sudden phase change of 180° occurs at the site of the bit change in the carrier oscillation.

In conformity with the ARI (Autofahrer-Rundfunk-Information=Radio Information for Motorists) system employed in Germany, a carrier frequency of 57 kHz is used. Upon RDS modulation, the 57 kHz carrier is suppressed on the transmitter side. The 57 kHz carrier therefore is regenerated on the receiver side, for example in a car radio, with the aid of a quartz oscillator and a digital "Costas loop". With the aid of a frequency divider, dividing the frequency of the regenerated carrier by 48, a bit rate clock signal having a bit rate of 1187.5 Hz is produced on the receiver side. On the receiver side, a phase synchronization of the bit rate clock signal with the digital RDS signal is carried out which is demodulated on the receiver side.

A basic endeavour with an RDS system consists in decoding the RDS data on the receiver side as fast as possible, so that the RDS information, such as name of radio station, alternative frequencies etc., are available as fast as possible. In order to make sure that correct RDS information is transmitted, the RDS bits are subject to a quality examination process.

In case of a correct RDS bit, one of the two half bits has a positive phase and the other one a negative phase. This holds also after a sudden phase change upon bit change between two RDS bits representing different logic values.

This property of the RDS signal may be utilized for a quality examination by checking both half bits of each RDS bit to see whether or not they have different phase signs. When the 57 kHz carrier recovered on the receiver side is not in phase with the RDS signal or when the RDS signal has a noise interference, these phenomena may be recognized and the RDS bit concerned is marked as "insecure".

However, this quality monitoring or examination operation works correctly only when the bit PLL on the receiver side is synchronized, i.e. when there is phase synchronism between the digital RDS signal demodulated on the receiver side and the bit rate clock signal generated on the receiver side. For, the determination as to which time periods of the RDS signal are interpreted as half bits thereof, is dependent upon the bit rate clock signal on the receiver side. This is why quality monitoring or examination works properly only when, at all times, such half bits of the RDS signal are examined with respect to different phase signs which belong to the same RDS bit.

As long as the bit PLL is not synchronized, i.e. when there is no phase synchronism between RDS signal and bit rate clock signal, the particular examination period may cover two half bits belonging to different RDS bits. In that case, the quality information obtained is not secure any more.

SUMMARY OF THE INVENTION

It is an object of the present invention to provide a method and circuit for assessing the quality and/or existence of a biphase-modulated digital RDS signal such that a positive statement on the quality of the RDS bits examined is ensured at all times, including the time period in which there is a lack of synchronization between RDS signal and bit rate clock signal.

Due to the fact that the present invention, during each quality examination operation, incorporates more half bits than belonging to one RDS bit, the correct result of the quality examination is obtained regardless of whether or not there is phase synchronism between RDS signal and bit rate clock signal.

With a quality examination method in which at all times only two adjacent half bits are included in the quality examination, correctness of the "RDS bits" is also reported when no RDS signal is transmitted at all, although no RDS bits are present. The reason therefor is that, when no RDS signal is transmitted, noise is received on the receiver side on the presumed RDS carrier frequency, and noise statistically has an equal number of periods of positive and negative phase signs. The conventional quality examination method thus arrives at the result that the number of positive phase signs is equal to the number of negative phase signs, which is rated as reception of correct RDS bits.

By contrast, the present invention does not make an evaluation as to whether or not an equal number of positive and negative phase signs occurs within the particular examination period, but as to whether a predetermined dissimilar ratio between positive and negative phase signs is present within the particular examination period, noise will not be misinterpreted when using the method according to the invention.

The present invention thus may be used in an RDS radio receiver for detecting whether or not a transmitter frequency, to which the RDS receiver is tuned at the particular time, sends RDS information. In case RDS information is sent on the transmitter frequency received, an assessment will be made rating at least the largest part of the RDS bits as "good". When the RDS receiver is tuned to the transmitting frequency of a radio station which indeed delivers ARI information, but no RDS information, information, namely the ARI information, is indeed sent via a 57 kHz carrier, but there is no biphase modulation since the latter is not employed in the ARI system. When no biphase-modulated signal is present, the predetermined ratio between positive phase signs and negative phase signs will not be present either during the respective quality examination period. Upon receipt of an ARI signal, the method according to the invention thus arrives at the rating "of poor quality" during all quality examination periods. This may be regarded as an assessment to the effect that no RDS signal is received.

In case the RDS receiver is tuned at a particular moment to the frequency of a radio station transmitting neither RDS nor ARI information, only noise will be received for the 57 kHz carrier on the receiver side. However, this leads to the assessment that an equal number of positive and negative phase signs is present within the particular quality examination period, and not the predetermined dissimilar ratio between positive and negative phase signs according to the invention. In this case, too, it is safely recognized that no RDS information is transmitted.

The present invention thus allows safe detection as to whether or not RDS information is transmitted via the transmitter frequency to which the RDS radio receiver is tuned at a particular moment.

DETAILED DESCRIPTION OF THE INVENTION

Figure 1:
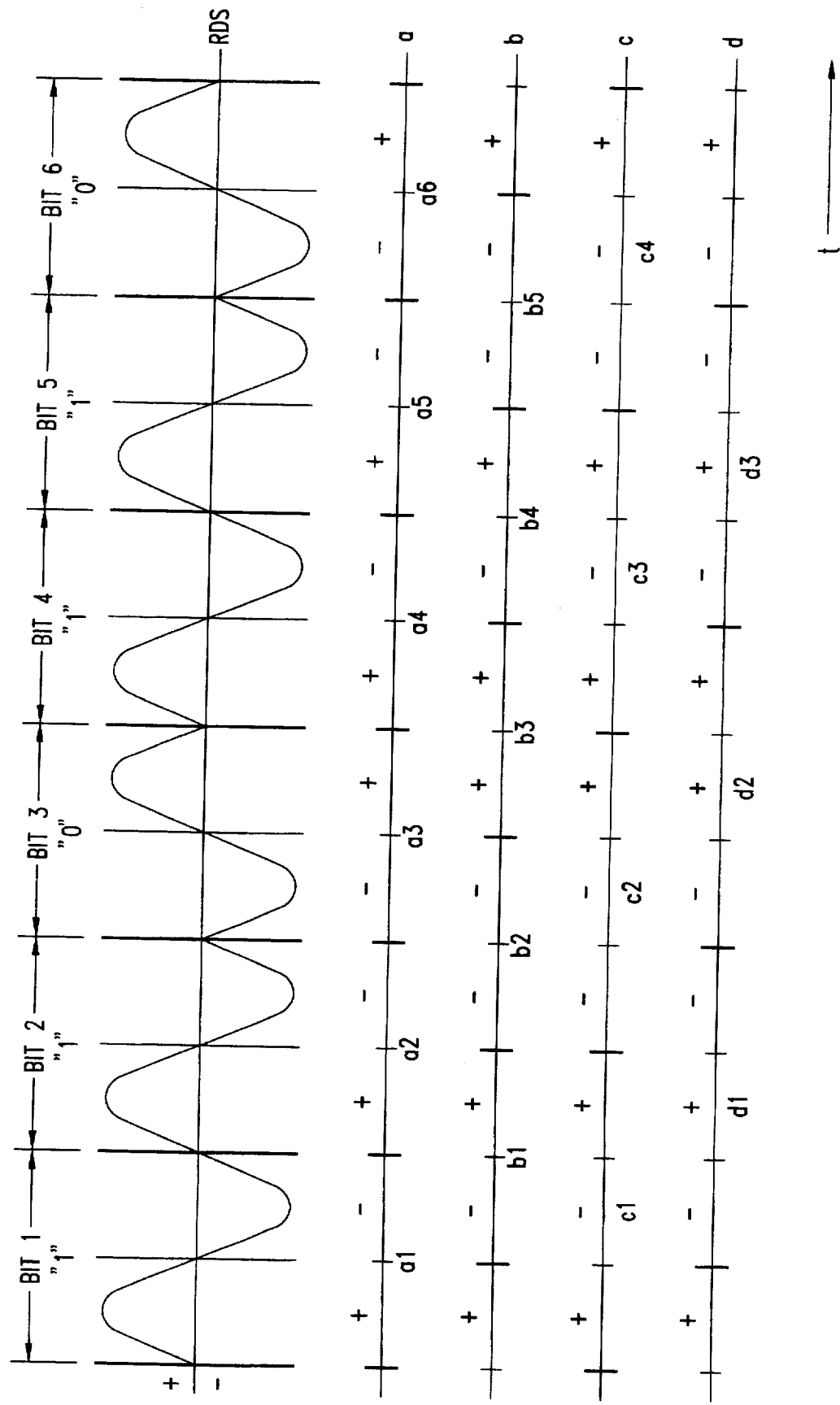
FIG. 1 shows the time pattern of an RDS signal and quality assessments obtained by processing the RDS signal in accordance with a prior art method and in accordance with a method of the present invention.

FIG. 1 shows the time pattern of an RDS signal for six RDS bits. Lines a and b located therebeneath indicate quality assessments in accordance with the known quality examination method, and lines c and d indicate assessments in accordance with the quality examination method according to the invention. Lines a and c indicate assessments of the conventional method and the method according to the invention, respectively, for the case in which there is phase synchronism between the RDS signal and the bit rate clock signal. Lines b and d indicate assessments of the conventional method and the method according to the invention, respectively, for the case in which the RDS signal and the bit rate clock signal are not in phase synchronism.

In the illustration of the RDS signal, the bit limits are marked by thick vertical lines, whereas the half bit limits within the individual RDS bits are marked as thin vertical lines. The signal portions above the abscissa are marked with a + sign, while the signal portions below the abscissa are marked with a − sign. This means, the signal portions above the abscissa have a positive phase sign and the signal portions below the abscissa have a negative phase sign.

As is usual in RDS biphase modulation, in RDS bits representing a logic value "1", the first half bits have positive phase signs, and the second half bits have negative phase signs. In contrast thereto, RDS bits with a logic value "0" have in their first half bits a negative phase sign and in their second half bits a positive phase sign. The RDS signal pattern in the drawing shown thus represents 6 RDS bits with the logic values 110110.

Lines a to d of the drawing shows along the abscissa or time axes t vertical lines. The distance between two vertical lines each corresponds to the duration of one half bit of the RDS signal and the bit rate clock signal, respectively. The time limits of the individual quality examination or monitoring periods are marked by thick vertical lines. This means for lines a and b that each quality monitoring period lasts as long as two half bit periods. Lines c and d show quality monitoring periods having a duration of 3 half bit periods each.

Lines a and b may be understood at the same time as representation of the bit rate clock signal. The thick vertical lines therein mark the bit transitions of the bit rate clock signal, whereas the thin vertical lines mark the half bit transitions with each bit of the bit rate clock signal. In line a, the time positions of the thick and the thin vertical lines are identical with the time positions of the thick and thin vertical lines of the RDS signal. RDS signal and bit rate clock signal are thus in phase synchronism. The thick and thin vertical lines in line b are phase shifted by 180° with respect to the thick and thin vertical lines of the RDS signal representation. Thus, there is no phase synchronism between the RDS signal and the bit rate clock signal of line b.

Lines a to d show for each half bit period the phase signs of the RDS signal during the corresponding half bit of the latter.

The quality assessment by means of the conventional quality monitoring method, in case of phase synchronization between the RDS signal and the bit rate clock signal as shown in line a, results in an assessment of all 6 RDS bits as correct or secure. In all quality monitoring periods a1 to a6, one positive and one negative phase sign each are present. Thus, an equal number of positive and negative phase signs is ascertained for each quality monitoring period. The assessment thus leads to a correct result in case of phase synchronism between RDS signal and bit rate clock signal.

In case of a phase shift between RDS signal and bit rate clock signal according to line b, a correct assessment is obtained only during the quality monitoring periods b1 and b4. During quality monitoring periods b2, b3 and b5, a wrong assessment is made, although the RDS signal is correct also during these quality monitoring periods. Despite a correct RDS signal, the quality assessment insecure or wrong is given three times during the 6 RDS bits.

With the quality monitoring or examination method of the invention according to lines c and d, each quality monitoring period consists of three adjacent half bits, which is in correspondence with the preferred embodiment of the invention. When the RDS signal is correct, there should be different phase signs with a ratio of 2:1 for each quality monitoring period: either twice as many positive phase signs as negative phase signs, or twice as many negative phase signs as positive phase signs.

In line c, which is based on the assumption that there is phase synchronism between the RDS signal and the bit rate clock signal, the ratio of 2:1 is obtained for all four illustrated quality monitoring periods.

When looking at the case shown in line d, in which no phase synchronism is present between the RDS signal and the bit rate clock signal, the ratio of 2:1 between the different phase signs occurring during the particular quality monitoring period is obtained in all three quality monitoring periods d1 to d3 shown.

While the conventional quality monitoring method according to lines a and b does not work properly any more when there is no phase synchronism between RDS signal and bit rate clock signal, the quality monitoring method according to the invention, shown in lines c and d, is insensitive to the phase position between RDS signal and bit rate clock signal.

In case of receipt of the transmitting frequency of a radio station that does not broadcast an RDS signal and thus does not generate a 57 kHz carrier, so that noise would be received on the receiver side, the conventional method according to lines a and h, seen statistically, would yield an even number of positive and negative phase signs during each quality monitoring period. Such noise thus would be rated by the conventional quality monitoring method as a correct RDS signal.

According to the quality monitoring method of the invention, according to lines c and d, noise would, statistically seen, also result in an equal number of positive and negative phase signs in each quality monitoring period. This would lead to an assessment ratio of 1:1 between positive and negative phase signs, and thus would be outside of the predetermined assessment ratio of 2:1. The method according to the invention thus would rate noise as being of poor quality.

The present invention may also use quality monitoring periods lasting more than three half bit periods. In order to be able to safely rate noise as being of poor quality, each quality monitoring period must have a duration of an odd number of half bits. The present invention thus could also be carried out with 5, 7, 9, . . . adjacent half bits per quality examination or monitoring period. In such cases, the assessment ratios would be 3:2, 4:3, and 5:4, respectively.

In general terms, if the quality monitoring period is m adjacent half bits, the assessment ratio is $(0.5*m+0.5):(0.5*m-0.5)$. However, the best result is obtained with three adjacent half bits per quality monitoring period. For, the higher the number of adjacent half bits per quality monitoring period, the closer one arrives at the ratio of 1:1 between positive and negative phase signs that must be present in each quality monitoring period in order to arrive at an assessment of a signal of good quality. And the closer one arrives at this ratio of 1:1, the harder it is to avoid that noise will be rated as being an RDS signal of good quality.

Figure 2:
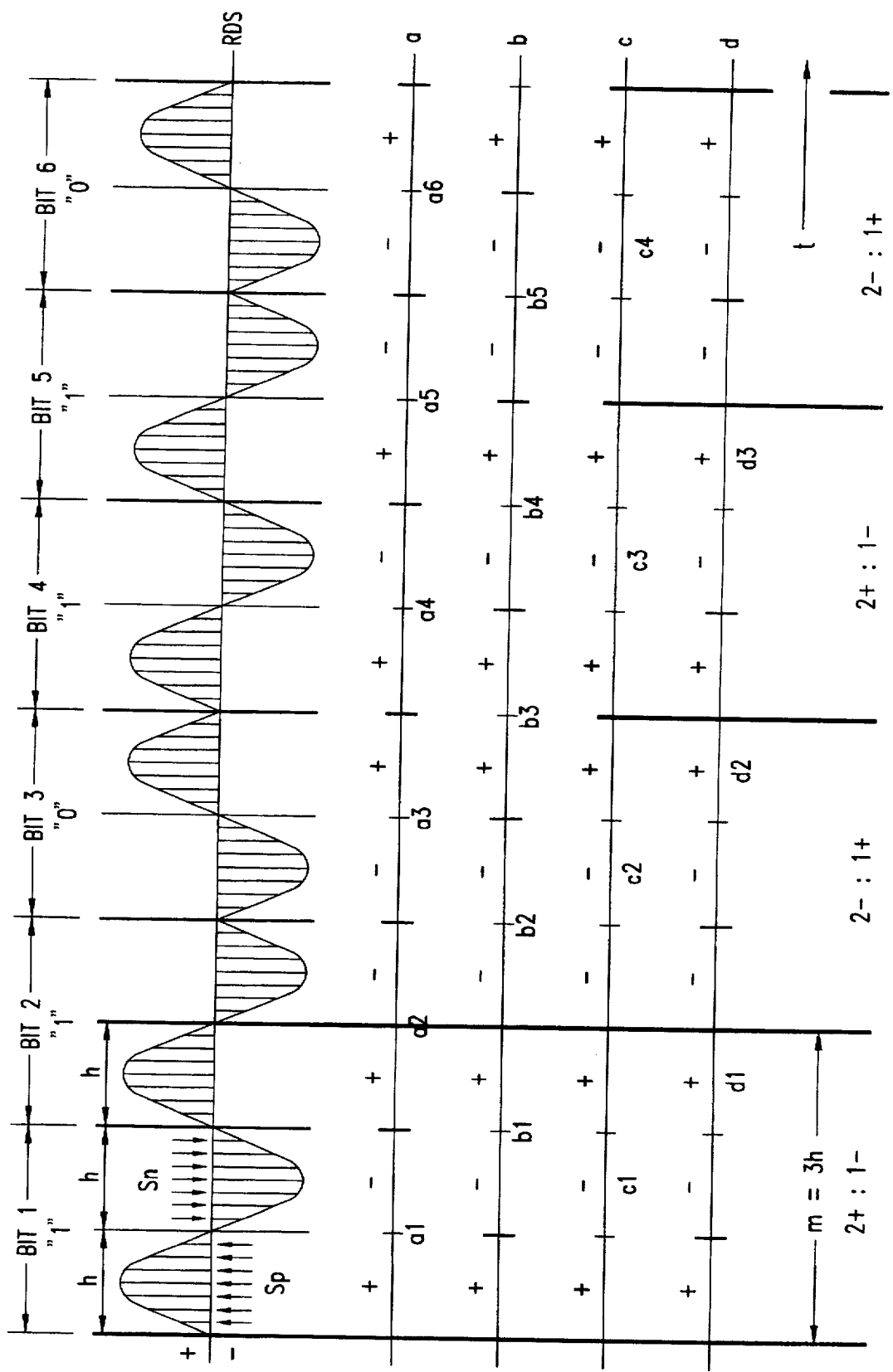
FIG. 2 shows the pattern of FIG. 1 and illustrates one method of sampling the RDS signal.

FIG. 2 is the RDS signal pattern of FIG. 1 showing quality monitoring periods of three adjacent half bits each. FIG. 2 also shows that 7 samples are taken for each half bit. For the first quality monitoring period, the first half bit of BIT1 has 7 positive value samples, the second half bit of BIT1 has 7 negative value samples, and the first half bit of BIT2 has 7 positive value samples. The assessment of the quality of the RDS signal is conducted on the basis of the samples.

With the following definitions:

m=number of adjacent half bits per quality monitoring period h=one half bit period s=samples per half bit h $s_p$=positive going samples $s_n$=negative going samples n=samples per quality monitoring period r=assessment ratio between positive and negative samples we can consider the following examples differing with respect to the number of adjacent half bits h per quality monitoring period m:

Example 1: for m = 3 h
s = 24
n = 72
the ratio r of a correct or good quality RDS signal is:
$s_p:s_n = 2:1$ or $s_n:s_p = 2:1$
Example 2: for m = 5 h
s = 24
n = 120
the ratio r of a correct or good quality RDS signal is:
$s_p:s_n = 3:2$
or $s_n:s_p = 3:2$
Example 3: for m = 7 h
s = 24
n = 168
the ratio r of a correct or good quality RDS signal is:
$s_p:s_n = 4:3$
or $s_n:s_p = 4:3$
Example 4: for m = 9 h
s = 24
n = 216
the ratio r of a correct or good quality RDS signal is:
$s_p:s_n = 5:4$
or $s_n:s_p = 5:4$ As described above, the most efficient and therefore preferred embodiment of the present invention uses three adjacent half bits per quality monitoring period, according to Example 1.

An implementation of the method of the present invention requires an assessment circuitry which is able to discriminate between correct or good quality RDS signals and incorrect or poor quality RDS signals, or in other words, between correct and incorrect assessment ratios. In view of the relatively large number of samples per quality monitoring period, it is preferred to tolerate deviations from the exact value of the correct assessment ratio to a predetermined extent.

Figure 3:
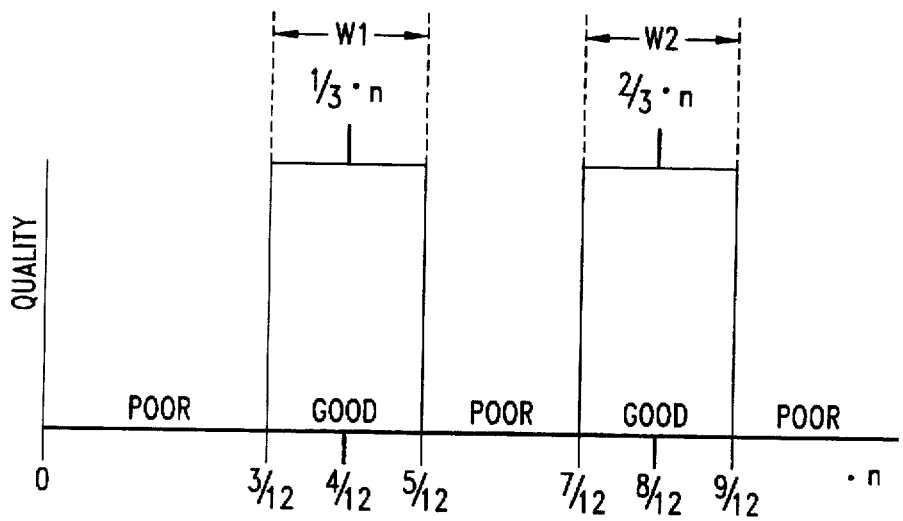
FIG. 3 shows a quality assessment diagram according to one embodiment of the present invention.

An assessment diagram of an example admitting such deviations within a predetermined range of tolerance is shown in FIG. 3 (for a quality assessment period of 3 half bits). This diagram shows marks of $1/3*n$ and of $2/3*n$ and first and second discriminating windows w1 and w2, respectively, the centers of which are these marks. It is assumed for the diagram of FIG. 3 that only positive samples $s_p$ or only negative samples $s_n$ are assessed. Looking at one type of samples only, e.g., the positive samples only, the RDS signal is correct if there is $$s_p:s_n = 2:1$$

or if there is $s_p:s_n = 1:2$

That means, the RDS signal is correct if the number of positive samples $s_p$ out of the number n of all (positive and negative) samples s per quality monitoring period m is either $1/3*n$ or $2/3*n$.

The RDS signal is, for instance, incorrect or poor if the number of positive samples $s_p$ out of the number n of all (positive and negative) samples s per quality monitoring period m is either $1/2*n$ (if there is no signal at all but only noise), or 0 or n (if there is received a pure ARI signal).

In the assessment diagram shown in FIG. 3, the first discriminating window w1 ranges from $3/12*n$ to $5/12*n$ whereas the second discriminating window w2 ranges from $7/12*n$ to $9/12*n$. Consequently, an RDS signal is assessed to be a good or correct RDS signal if the ratio $$\text{positive samples } s_p\text{:all samples n per m}$$

is in the ranges from 3/12 to 5/12 or 7/12 to 9/12.

And the RDS signal is considered to be incorrect or poor of this ratio is outside these ranges. As an example, for a quality assessment period of 3 half bits and a sampling rate of 4 per half bit (n=12) the RDS signal is considered to be correct when the number of positive value samples $s_p$ is in a first window range of 3 to 5 or in a second window range of 7 to 9.

Figure 4:
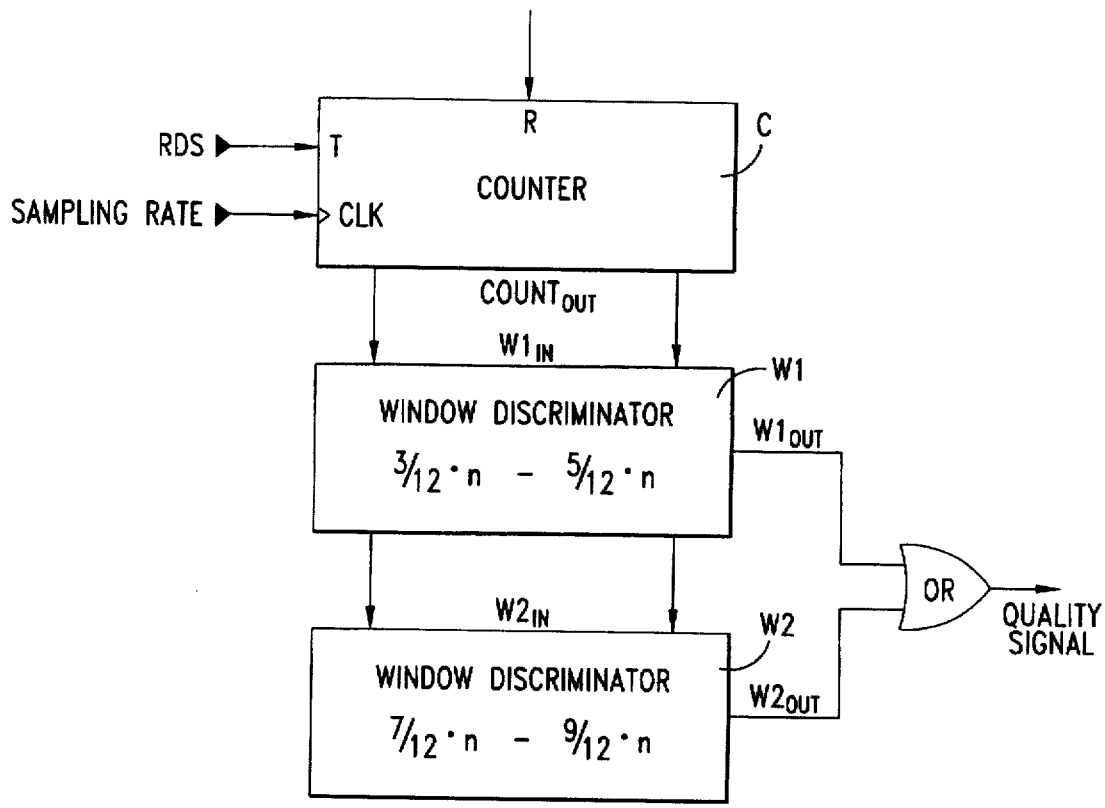
FIG. 4 shows a block diagram of a quality assessment circuitry according to the present invention.

An assessment circuitry accomplishing the discrimination method of FIG. 3 is shown in FIG. 4 in the form of a block diagram. A counter C has three inputs: an enable counting input T which is to be supplied with the RDS signal and which enables counter C to count only when the RDS signal is in its positive phase; a clock input clk which receives a sample rate pulse signal; and a reset input R which receives a reset signal at the end of each quality monitoring period m.

Counter C has an output $COUNT_{out}$ simultaneously supplying the final count of positive samples $s_p$ reached at the time of resetting counter C, to an input $W1_{in}$ of a first window discriminator W1 and to an input $W2_{in}$ of a second window discriminator W2. Window discriminators W1 and W2 have outputs $W1_{out}$ and $W2_{out}$ respectively, one of which delivers an output pulse if the final count is detected to be within the discriminating window of W1 or W2. The outputs of W1 and W2 are connected to a respective one of two inputs of an OR gate OR an output of which delivers a quality assessment signal having a first binary value if the final count of counter C is within one of the discriminating windows of W1 and W2 and which has a second binary value if the final count is outside the discriminating windows of both discriminators W1 and W2.

It will be appreciated that, although specific embodiments of the invention have been described herein for purposes of illustration, various modifications may be made without departing from the spirit and scope of the invention. Accordingly, the invention is not limited except as by the appended claims.

I claim:

1. A method of assessing the quality of a data signal containing a plurality of bits, each bit of the data signal including two half bits wherein a correct bit of the data signal contains one half bit having a first logic value and one half bit having a second logic value, the method comprising the steps of:

receiving the data signal;

generating a clock signal containing a plurality of bits, each bit of the clock signal including two half bits;

sensing a number of half bits of the data signal having the first logic value during an assessment period, the assessment period containing an odd number m of adjacent half bits of the clock signal wherein m is greater than 2; and outputting a quality assessment signal indicating that the data signal is of good quality when the number of half bits of the data signal having the first logic value corresponds to a number within a predetermined range.

2. The method according to claim 1 wherein the number is either 0.5*m+0.5 or 0.5*m−0.5.

3. The method according to claim 1 wherein m is 3 and the number is either 1 or 2.

4. The method according to claim 1 wherein the step of sensing a number of half bits includes the step of:

sampling the data signal to generate n samples during the assessment period, wherein the data signal is determined to be of good quality when the number of samples having the first logic value among the n samples corresponds to the predetermined range.

5. The method according to claim 4 wherein m is 3, n is 12 and the predetermined range is either from 3 to 5 or from 7 to 9.

6. The method according to claim 4 wherein the predetermined range is centered either about the number $$\frac{(1/2)*m + 1/2}{m} * n$$

or about the number $$\frac{(1/2)*m - 1/2}{m} * n.$$

7. In a data receiver circuit adapted to receive a data signal containing a plurality of bits of data and to generate a clock signal containing a plurality of bits for reading the data contained in the data signal, each bit of the data signal and each bit of the clock signal including two half bits wherein a correct bit of the data signal contains one half bit having a first logic value and one half bit having a second logic value and each bit of the clock signal includes two half bits, a method of assessing the quality of the data signal comprising the steps of:

counting a number of half bits of the data signal having a first logic value during an assessment period, the assessment period containing an odd number m of adjacent half bits of the clock signal wherein m is greater than 2;

detecting a number of half bits of the data signal having a second logic value during the assessment period; and outputting a quality assessment signal indicating that the data signal is of good quality when a ratio of the number of half bits of the data signal having the first logic value to the number of half bits of the data signal having the second logic value corresponds to a predetermined ratio.

8. The method according to claim 7 wherein m is 3 and the predetermined ratio is 2:1 or 1:2.

9. In a data receiver circuit adapted to receive a data signal containing a plurality of bits of data and to generate a clock signal containing a plurality of bits for reading the data contained in the data signal, each bit of the data signal including two half bits wherein a correct bit of the data signal contains one half bit having a first logic value and one half bit having a second logic value and each bit of the clock signal includes two half bits, a data assessment circuit for assessing the quality of the data signal comprising:

a counter receiving the data signal and counting a number of half bits of the data signal having the first logic value during an assessment period, the assessment period containing an odd number m of adjacent half bits of the clock signal wherein m is greater than 2;

a first comparator circuit having an input connected to the counter for receiving a final count of the number of half bits of the data signal having the first logic value at the end of the assessment period, the first comparator circuit generating at an output a first signal when the final count corresponds to a first number or is within a first range of numbers;

a second comparator circuit having an input connected to the counter for receiving the final count of the number of half bits of the data signal having the first logic value at the end of the assessment period, the second comparator circuit generating at an output a second signal when the final count corresponds to a second number or is within a second range of numbers; and a logic circuit connected to the first and second comparator circuits, the logic circuit generating a third signal indicating that the data signal is of good quality when the logic circuit receives the first signal from the first comparator circuit or the second signal from the second comparator circuit.

10. The data assessment circuit according to claim 9 wherein m is 3, the first number is 1, and the second number is 2.

11. The data assessment circuit according to claim 9 wherein the counter samples the data signal to generate n samples during the assessment period and generates a final count of the number of samples having the first logic value among the n samples.

12. The data assessment circuit according to claim 11 wherein m is 3, n is 12, the first range is from 3 to 5, and the second range is from 7 to 9.

13. A method of assessing the quality and/or existence of a biphase-modulated digital RDS signal having a plurality of bits in a radio signal broadcast by a radio transmitter and received by a radio receiver equipped for RDS, in which a bit rate clock signal having a plurality of bits is produced in the radio receiver having a bit rate which is identical to that of the RDS signal, the bits of both the RDS signal and the bit rate clock signal being comprised of two half bits, and of the two half bits belonging to each bit of the RDS signal, one has a positive phase and the other one has a negative phase, the method comprising the steps of:

determining a number of positive phase half bits contained in the RDS signal during a predetermined number m of adjacent half bits of the bit rate clock signal, the predetermined number m being an odd integer greater than 2;

determining a number of negative phase half bits contained in the RDS signal during the predetermined number m of adjacent half bits of the bit rate clock signal;

determining a first ratio from the number of positive phase half bits and the number of negative phase half bits;

performing a comparison of the first ratio with a predetermined numerical ratio; and rating the RDS signal as being a signal of good quality or a signal of poor quality based on the comparison.

14. The method according to claim 13, further comprising the step of selecting the number m to be 3.

15. The method according to claim 13 wherein the RDS signal is sampled n times per the predetermined number of m adjacent half bits, a number of either positive phase samples $s_p$ or of negative phase samples $s_n$ occurring during the predetermined number of m adjacent half bits is counted and the RDS signal is assessed to be correct if a ratio of the number of positive phase samples $s_p$ or negative phase samples $s_n$ counted to the total number of samples n during the predetermined number of m adjacent half bits is approximately $$\frac{(1/2)*m + 1/2}{m} \text{ or } \frac{(1/2)*m - 1/2}{m}$$

16. The method of claim 15 wherein the step of rating the RDS signal comprises the step of rating the RDS signal to be correct if the ratio of the number of positive or negative, respectively, phase samples counted to the total number of samples n during the predetermined number m of adjacent half bits of the bit rate clock signal is within one of two discriminating windows, one window centered about the number $$\frac{(1/2)*m + 1/2}{m}$$

and the other window centered about the number $$\frac{(1/2)*m - 1/2}{m}$$

17. The method of claim 15 wherein the step of rating the RDS signal comprises the step of assessing the RDS signal to be correct if a ratio of the number of positive phase samples or negative phase samples to the total number of samples n is approximately $$\frac{(1/2)*m + 1/2}{m} \text{ or } \frac{(1/2)*m - 1/2}{m}.$$

18. A method according to claim 13 wherein the steps of determining a number of positive phase half bits and determining a number of negative phase half bits comprise the steps of:

sampling the RDS signal to generate n samples during the predetermined number m of adjacent half bits of the bit rate clock signal; and determining a number of either positive phase samples or negative phase samples from the n samples.

19. An assessment circuit for assessing the quality and/or the existence of a biphase-modulated digital RDS signal having a plurality of bits in a radio signal broadcast by a radio transmitter and received by a radio receiver, the radio receiver generating a bit rate clock signal having a plurality of bits with a bit rate identical to a bit rate of the RDS signal wherein the bits of both the RDS signal and the bit rate clock signal include two half bits and a correct bit of the RDS signal contains one half bit having a positive phase and one half bit having a negative phase, the circuit comprising:

a sampling means for sampling the RDS signal n times during a predetermined number m of adjacent half bits of the bit rate clock signal to generate n samples;

a counter means being enabled to count either positive phase samples or negative phase samples of the RDS signal and to be reset at the end of the predetermined number of m adjacent half bits;

a window discriminator means being enabled to receive a final count of the positive or negative, respectively, phase samples occurring at an end of the predetermined number m of adjacent half bits of the bit rate clock signal and to output discriminating signals of a first nature if a ratio of the final count to the total number of samples n is within one of two discriminating windows, one window centered about the number $$\frac{(1/2)*m + 1/2}{m}$$

and the other window centered about the number $$\frac{(1/2)*m - 1/2}{m}$$

and of a second nature if the ratio is outside said discriminating windows; and an evaluating means being enabled to receive the signals from the window discriminator means and to output a signal indicating the occurrence of a correct signal if the window discriminator means outputs a signal of the first nature and a signal indicating the occurrence of an incorrect RDS signal or no RDS signal if the window discriminator means outputs signals of the second nature only.

\* \* \* \* \*